United States Patent [19]
Pavel et al.

[11] Patent Number: 4,896,500
[45] Date of Patent: Jan. 30, 1990

[54] METHOD AND APPARATUS FOR OPERATING A COMBINED CYCLE POWER PLANT HAVING A DEFECTIVE DEAERATOR

[75] Inventors: James Pavel, Lake Mary; Bennie L. Richardson, Winter Park; Gerald A. Myers, Longwood, all of Fla.

[73] Assignee: Westinghouse Electric Corp., Pittsburgh, Pa.

[21] Appl. No.: 352,599

[22] Filed: May 15, 1989

[51] Int. Cl.4 ............................................. F01K 7/00
[52] U.S. Cl. ................................. 60/39.182; 60/646; .60/657
[58] Field of Search ..................... 60/646, 657, 39.182

[56] References Cited

U.S. PATENT DOCUMENTS

| | | | |
|---|---|---|---|
| 3,866,108 | 2/1975 | Yannone et al. | 322/14 |
| 3,891,915 | 6/1975 | Yannone et al. | 322/15 |
| 3,919,623 | 11/1975 | Reuther | 322/15 |
| 3,953,966 | 5/1976 | Martz et al. | 60/39.02 |
| 3,955,358 | 5/1976 | Martz et al. | 60/39.18 B |
| 3,965,675 | 6/1976 | Martz et al. | 60/39.18 B |
| 3,973,391 | 8/1976 | Reed et al. | 60/39.29 |
| 3,974,645 | 8/1976 | Smith | 60/39.29 |
| 3,975,902 | 8/1976 | Smith et al. | 60/39.25 |
| 4,028,884 | 6/1977 | Martz et al. | 60/39.18 B |
| 4,031,404 | 6/1977 | Martz et al. | 290/40 R |
| 4,032,793 | 6/1977 | Uram | 290/40 C |
| 4,047,005 | 9/1977 | Heiser et al. | 235/151.21 |
| 4,118,635 | 10/1978 | Barrett et al. | 290/40 R |
| 4,201,924 | 5/1980 | Uram | 290/40 R |
| 4,283,634 | 8/1981 | Yannone et al. | 290/40 R |
| 4,308,463 | 12/1981 | Giras et al. | 290/1 |
| 4,380,146 | 4/1983 | Yannone et al. | 60/39.141 |
| 4,455,614 | 6/1984 | Martz et al. | 364/494 |
| 4,552,099 | 11/1985 | Martens et al. | 122/451.1 |
| 4,555,906 | 12/1985 | Martens et al. | 60/660 |

Primary Examiner—Allen M. Ostrager
Attorney, Agent, or Firm—K. Bach

[57] ABSTRACT

A deaerating subsystem in a combined cycle power plant includes a deaerator and a storage tank coupled to the deaerator, the deaerating subsystem being adapted for isolation of the deaerator when it is defective even while the overall combined cycle power plant is operating. Blind flanges are provided in a downcomer and in vapor risers between the deaerator and the storage tank for such isolation. Also provided is a condensate bypass for preventing the reception of the condensate by the deaerator, and for enabling the storage tank to receive the condensate directly. Thermal energy is input into the storage tank such that controlled amounts of heated condensate from the steam generator, and controlled amounts of dry steam can be input to the storage tank while the deaerator is isolated for repairs.

23 Claims, 4 Drawing Sheets

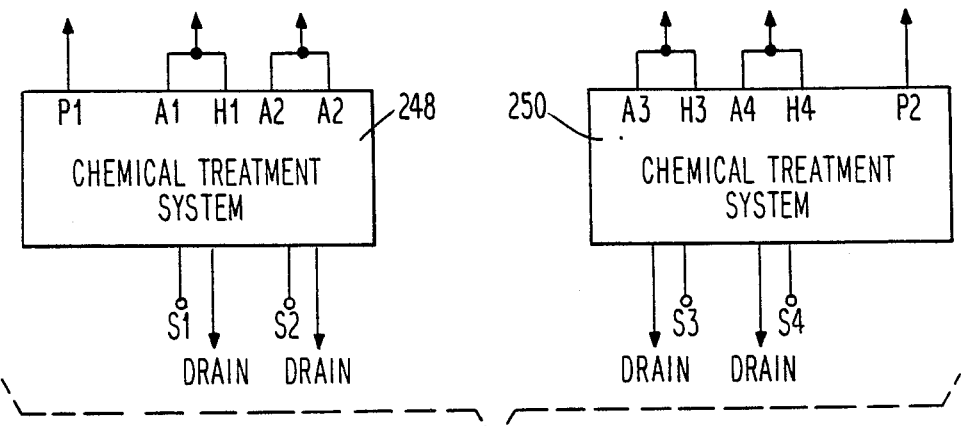
_Fig. 2C_
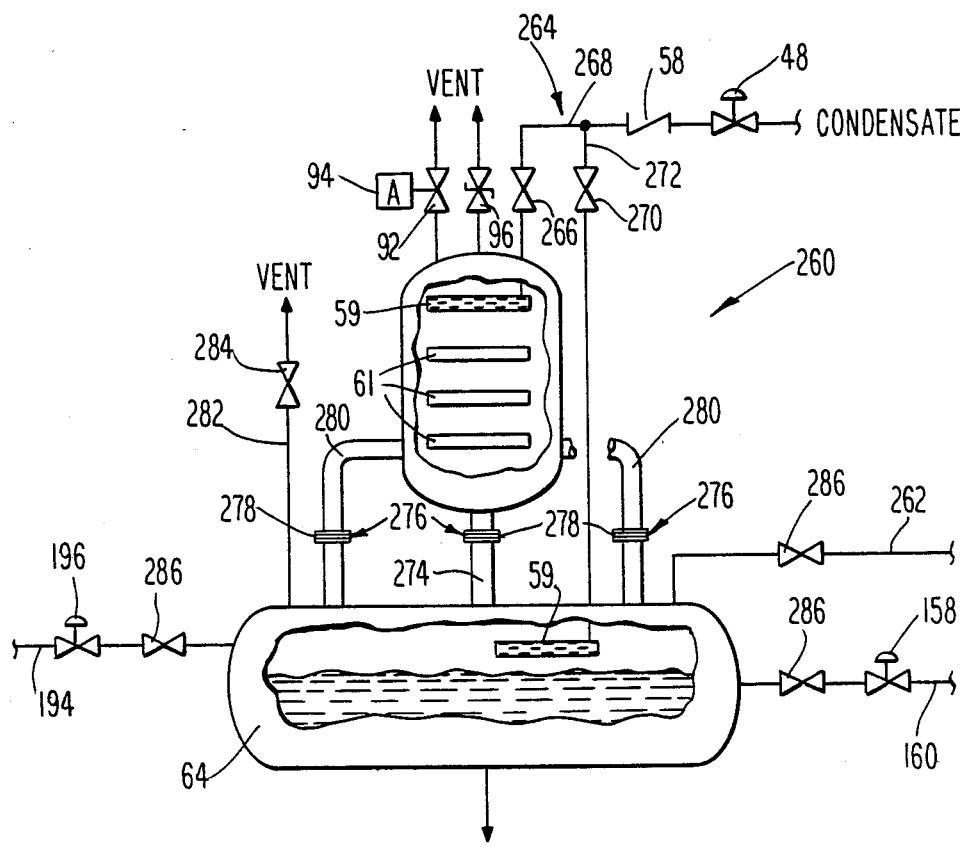
_Fig. 3_

4,896,500

METHOD AND APPARATUS FOR OPERATING A COMBINED CYCLE POWER PLANT HAVING A DEFECTIVE DEAERATOR

BACKGROUND OF THE INVENTION

1. Field of the Invention

This invention relates generally to deaerators, and more particularly to spray tray-type deaerators that are used in combined cycle power plants.

2. Statement of the Prior Art

Combined cycle power plants are well known designs for the efficient generation of electricity by utilizing both gas and steam turbines Described most simply, the process employed within combined cycle power plants uses one or more gas turbines (which are also referred to as "combustion turbines") not only to generate electricity directly through their associated electric generators, but also to assist in the generation of additional electricity through a steam turbine. That is, the hot exhaust gases issuing from the gas turbine provide waste heat which is used to generate steam to drive the steam turbine.

In this manner, the otherwise waste heat that is contained in the gas turbine exhaust gases is effectively utilized. Such combined cycle power plants also generally comprise one or more heat recovery steam generators (which are also referred to as HRSG's, or simply "steam generators") and a condenser that is associated with the steam turbine for receiving the spent steam to convert it into a condensate for supply back to the steam generator.

A typical steam generator includes a deaerator to provide the following functions The primary function of a deaerator is to "degasify" the feedwater that is used to generate steam in the steam generator. Gases, typically oxygen, that become entrained in the feedwater are removed by well known means within such deaerators. However, deaerators also perform the following secondary functions: (1) they heat the feedwater to a temperature that is sufficient to avoid corrosion of low-temperature sections of the steam generator; (2) they provide a source of water that is of a sufficient capacity and head pressure in order to satisfy the requirements of the boiler feed pumps during steady state and transient operations of the combined cycle plant; and (3) they provide a location where low level thermal energy, in the form of hot water or low pressure steam, can be effectively utilized to enhance overall efficiency of the combined cycle plant.

A spray-tray type deaerator is most frequently used in combined cycle plants With a spray-tray deaerator, deaeration is accomplished in two stages. Condensate from the condenser is first atomized by spray nozzles and heated to a point near the saturation temperature. This first stage, thus, produces the conditions and surface area necessary to allow the dissolved air to readily escape. Thereafter, additional deaeration is accomplished in the tray stage, in which the condensate flows downwardly across a series of trays while water vapor passes counter-currently to sweep the gases from the liquid. As is conventional, gases and water vapor leave the uppermost tray and flow to the spray section. Then, the water vapor is condensed while heating the incoming condensate, and the free gases are vented from the top of the deaerator.

A deaerating subsystem in a combined cycle plant is typically constructed as two separate vessel. One such vessel is the deaerator itself, while the other vessel is a storage tank. Deaerated water from the lowest tray of the deaerator flows directly into the storage tank through a downcomer to maintain a liquid level therein. The water vapor that is required for the deaerator may be obtained by extracting vapor from the space within the storage tank above this liquid level through risers, although low pressure steam from another, external source is often admitted into the deaerator for this purpose.

Spray-tray deaerators are subject to failures of their internal parts (e.g., the spray nozzles and trays) which can significantly reduce their ability to perform their primary function of degasification When failures of a combined cycle plant's deaerator occur, feedwater is then degasified by known alternate methods such as degasification in the condenser, degasification of the make-up water, or chemical scavenging by injection of hydrazine or other known chemicals that are used to remove oxygen.

However, these alternate degasification methods are not as effective or economical over the entire operating range of a combined cycle plant as traditional spraytray deaeration. They may be used for periods of time that are sufficiently short that the impact of boiler tube corrosion and increased chemical costs are insignificant, but for extended periods of time, the increased costs and potential risks that are associated with operation of a combined cycle plant without a deaerator dictate that a failed deaerator must be removed from service for repairs.

Such deaerator repairs, however, normally require shutdown of the entire combined cycle plant. This is because feedwater cannot be provided at a suitable temperature, capacity, and pressure with the deaerator out of service, even though sufficient degasification can be temporarily provided by the alternate methods discussed above.

SUMMARY OF THE INVENTION

Accordingly, it is a general object of the present invention to provide methods and apparatus for operating a combined cycle plant which has a defective deaerator. More specifically, it is an object of the present invention to provide methods and apparatus for operating a combined cycle plant, and still provide the secondary functions that are typically performed by a deaerator in spite of that deaerator's being removed from service for repairs.

Another object of the present invention is to provide for moderate amounts of degasification with a storage tank of a deaerating subsystem while the deaerator itself is out of service.

Still another object of the present invention is to provide methods and apparatus for readily removing a defective deaerator from service, during operations of the combined cycle plant, to permit that deaerator to be repaired and quickly returned to service with a minimum disruption to the overall efficiency of the combined cycle plant.

Briefly, these and other objects according to the present invention are accomplished by an improved and adaptable deaerating subsystem for use in a combined cycle power plant of the type having a gas turbine, a steam turbine, and a steam generator producing motive steam from feedwater that is pumped therethrough by a boiler feed pump.

The deaerating subsystem according to the present invention generally comprises a deaerator that is adapted for receiving a supply of condensate, and for performing a primary function of degasifying said condensate as well as a plurality of secondary functions including heating the feedwater a sufficient amount to prevent corrosion of critical portions of the steam generator, providing a source of the feedwater of a sufficient capacity and head pressure to satisfy requirements of the boiler feed pump during steady state and transient operations of the plant, and providing a location for inputting selected amounts of thermal energy to enhance the overall efficiency, and a storage tank coupled to the deaerator.

Such coupling is provided for, first, by downcomer means that includes flange means with a blind flange which is adapted to be inserted within the downcomer means for selectively preventing reception of said degasified condensate by the storage tank, and condensate bypass means for preventing the reception of the condensate by the deaerator, and for enabling the storage tank to receive the condensate.

Means for inputting thermal energy into the storage tank are also provided, wherein the thermal energy input means controlled amounts of heated condensate from the steam generator, and controlled amounts of dry steam can be input to the storage tank. The storage tank is also coupled to the deaerator by vapor riser means which enables the dry steam that is input to the storage tank to be received by the deaerator. Like the downcomer means, the vapor riser means includes flange means with a blind flange which is adapted to be inserted within the vapor riser means for selectively preventing such reception of the dry steam by the deaerator.

In such a manner, the deaerator is adapted to be isolated from an operating combined cycle power plant simply by using known alternate methods of degasifying the feedwater, isolating the thermal energy inputs to the deaerator, operating the condensate bypass means to allow the condensate to enter directly into the storage tank and to shut off the flow of condensate to the deaerator, installing the blank flanges to within the downcomer means and the vapor riser means to isolate the deaerator from the storage tank, and operating the thermal energy input means connected to the storage tank to perform the secondary functions of a deaerator therein. When the necessary repairs have been made to the defective deaerator, the above steps can be reversed and the deaerator brought back into service without a significant disruption of the overall efficiency of the operating combined cycle plant.

Other objects, advantages and novel features in accordance with the present invention will become more apparent from the following detailed description of a preferred embodiment thereof, when considered in conjunction with the accompanying drawings wherein

BRIEF DESCRIPTION OF THE DRAWINGS

FIGS. 2A, 2B and 2C (which are interconnected as shown) in detail show fluid connections between a single gas turbine, a single steam turbine, and a single heat recovery steam generator of the combined cycle power plant of the prior art shown in FIG. 1; and FIG. 3 diagrammatically illustrates an improved deaerator and storage tank apparatus which, according to the present invention, permits operation of the combined cycle power plant shown in FIGS. 1, 2A, 2B and 2C above in spite of the plant's having a defective deaerator.

DETAILED DESCRIPTION OF THE INVENTION

Figure 1:
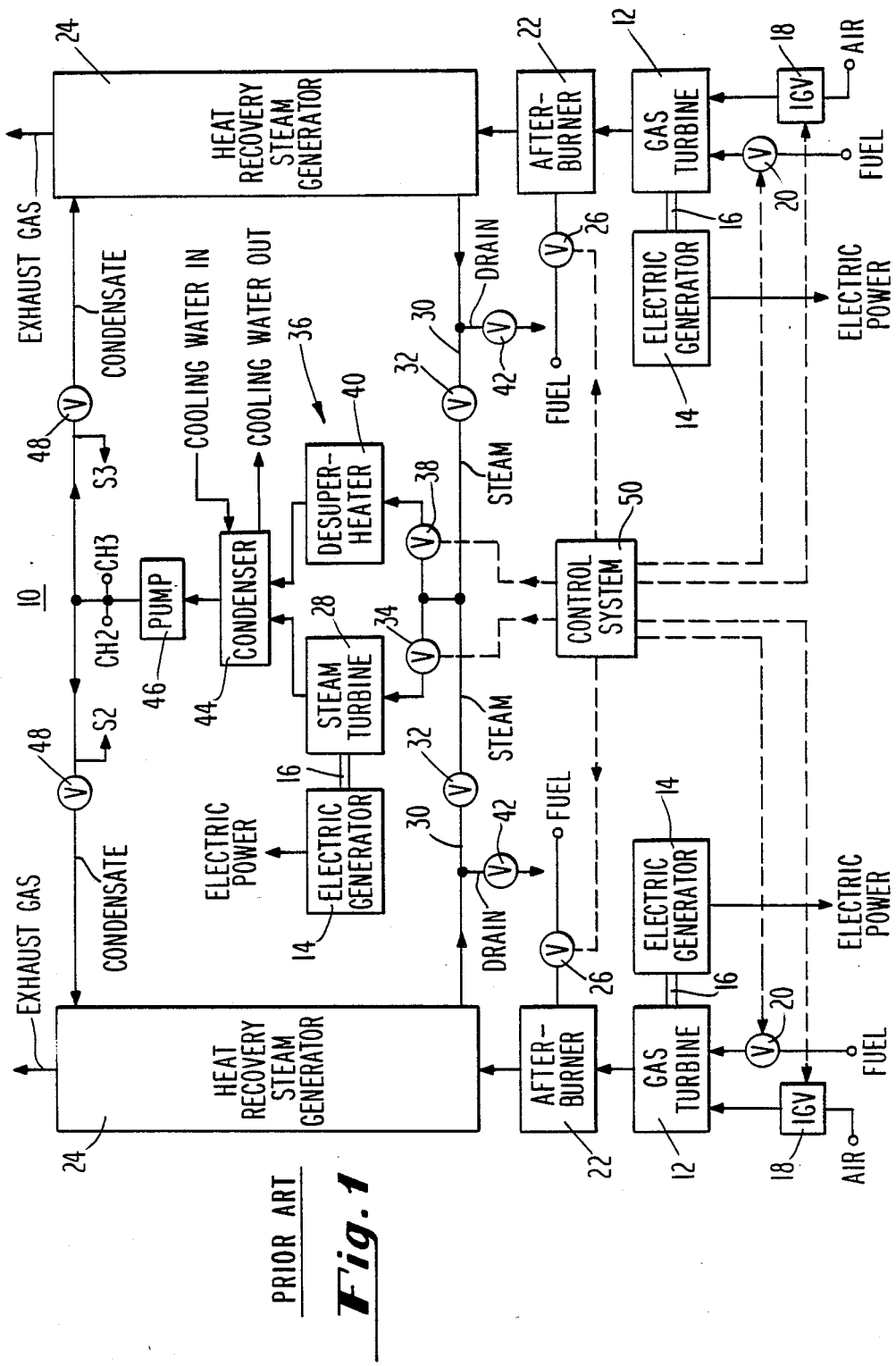
FIG. 1 is a functional block diagram of a typical combined cycle power plant.

Referring now to the drawings, wherein like numbers designate like or corresponding parts throughout each of the several views, there is shown in FIG. 1 a functional block diagram of a combined cycle electric power plant 10 in accordance with the present invention.

As with conventional combined cycle electric power plants, the plant 10 includes one or more combustion or gas turbines 12. Suitable such gas turbines 12 are the W-501 series gas turbines which are manufactured by the assignee of the present invention. Each gas turbine 12 drives a respective electric generator 14, coupled by a shaft 16 to the gas turbine 12.

Combustion air enters each of the gas turbines 12 by way of an inlet guide vane positioning means 18 for modulation of the inlet guide vanes (not shown) of the gas turbines 12. Such modulation of a gas turbine's inlet guide vanes for differing purposes is well known (e.g., see U.S. Pat. Nos. 3,891,915, 3,973,391, and 4,308,463).

Air entering the gas turbine 12 is then compressed for burning a suitable fuel that is supplied to the gas turbine 12 by way of a fuel control or "throttle" valve 20. Such burning, as is also well known, produces high temperature exhaust gas which is optionally passed from the gas turbine 12 through an afterburner 22, through a heat recovery steam generator 24, and finally exhausted to the atmosphere.

Where installed, the afterburners 22 include a burner mechanism (not shown) for further increasing the temperature of the gas turbine exhaust gas before it enters the steam generator 24, fuel being supplied to the burner mechanisms by way of additional fuel control or "throttle" valves 26. The primary heat source for the steam generator 24, however, is the gas turbine 12

That is, the afterburners 22 act in the nature of a supplemental heat source for providing supplemental heat when needed. In terms of typical fuel usage, therefore, approximately 80% of the fuel is used in the gas turbine 12 and approximately 20% of the fuel is used in the afterburner 22.

As is conventional with other such combined cycle electric power plants, the plant 10 also includes at least one steam turbine 28 that is driven by the steam which is generated by the steam generators 24 and that, in turn, drives another electric generator 14 which is coupled to the steam turbine 28 by another shaft 16. In such a manner, each of the three electric generators 14 shown in FIG. 1 is, thus, adapted to produce electric power.

Superheated steam i provided to the steam turbine 28 from both of the steam generators 24 in an efficient manner as described in greater detail herein below. A predetermined mass flow of such superheated steam is set up through suitable piping 30 from the steam generators 24 to the steam turbine 28, as controlled by respective isolation valves 32 and a steam throttle valve 34. Also provided in the plant 10 is a bypass path 36 for use at such times when a selected amount of the superheated steam is to be routed around the steam turbine 28. This bypass path 36 includes a steam turbine bypass valve 38, a desuperheater 40, and appropriate piping.

Each of the steam generators 24 is also provided with a steam drain that is controlled by a drain valve 42.

The steam that is spent by the steam turbine 28 in its production of mechanical power to drive the electric generator 14 coupled thereto, as well as any steam from the desuperheater 40, is then passed to a condenser 44. In the typical arrangement shown, cooling water is continuously circulated into and out of the condenser 44 from a source (not shown) in order to convert such steam back into water or "condensate". Other condenser types, such as air-cooled or estuary-cooled condensers, may also be utilized. In order to close the loop, the condensate is subsequently returned to each steam generator 24 by a condensate pump 46 through respective condensate flow control valves 48.

Overall operation of the plant 10 is maintained by a conventional control system 50, typical control signal lines being shown in a broken line manner. From highest to lowest in terms of degree of automation, the control system 50, thus, provides for: (1) plant coordinated control; (2) operator automatic control; (3) operator analog control; and (4) manual control. When operating at the highest (i.e, pant coordinated control) level of control, the control system 50 automatically coordinates the settings of the inlet guide vanes (not shown) by way of the inlet guide vane positioning means 18, the fuel control valves 20 and 26, the steam throttle valve 34, and the steam turbine bypass valve 38.

While many suitable control systems are known, the following patents are indicative of control systems which are adapted for use in combined cycle electric power plants: U.S. Pat. Nos. 3,866,108; 3,919,623; 3,955,358; 3,853,966; 3,974,645; 3,975,634; 3,975,902; 4,028,884; 4,031,404; 4,032,793; 4,047,005; 4,118,635; 4,201,924; 4,283,634; 4,380,146; and 4,455,614, each of which is assigned to the assignee of the present invention and is incorporated herein by reference.

It should be noted at this juncture that the abovedescribed plant 10 is capable of operating in any one of the following configurations: (1) using both of the gas turbines 12 with the steam turbine 28; or (2) using only one of the gas turbines 12 with the steam turbine 28; or (3) using both of the gas turbines 12 without the steam turbine 28; or (4) using only one of the gas turbines 12 without the steam turbine 28. Since at least one of the gas turbines 12 must be utilized to generate steam, it is readily apparent that the steam turbine 28 by itself will not operate.

However, in order to obtain the benefits which attend combined cycle electric power plant operations, at least one of the gas turbines 12 must be utilized with the steam turbine 28. Nevertheless, when one of the gas turbines 12 is not being used or is shut down for maintenance purposes, the steam generator 24 which is associated with such idle gas turbine 12 can also be shut down by closing its respective isolation valve 32 and condensate flow control valve 48.

On the other hand, when the steam turbine 28 is not being used or is shut down for maintenance purposes, the steam that is generated by the steam generators 24 may be bypassed through closure of the steam throttle valve 34, opening of the steam turbine bypass valve 38, and routing of the steam to the condenser 44 through the desuperheater 40 and bypass piping. As an alternative, when the steam turbine 28 is not being used or is shut down for maintenance purposes, either one or both of the steam generators 24 can be drained and vented by the appropriate setting of the isolation valves 32, drain valves 42, and condensate flow control valves 48.

Figure 2A:
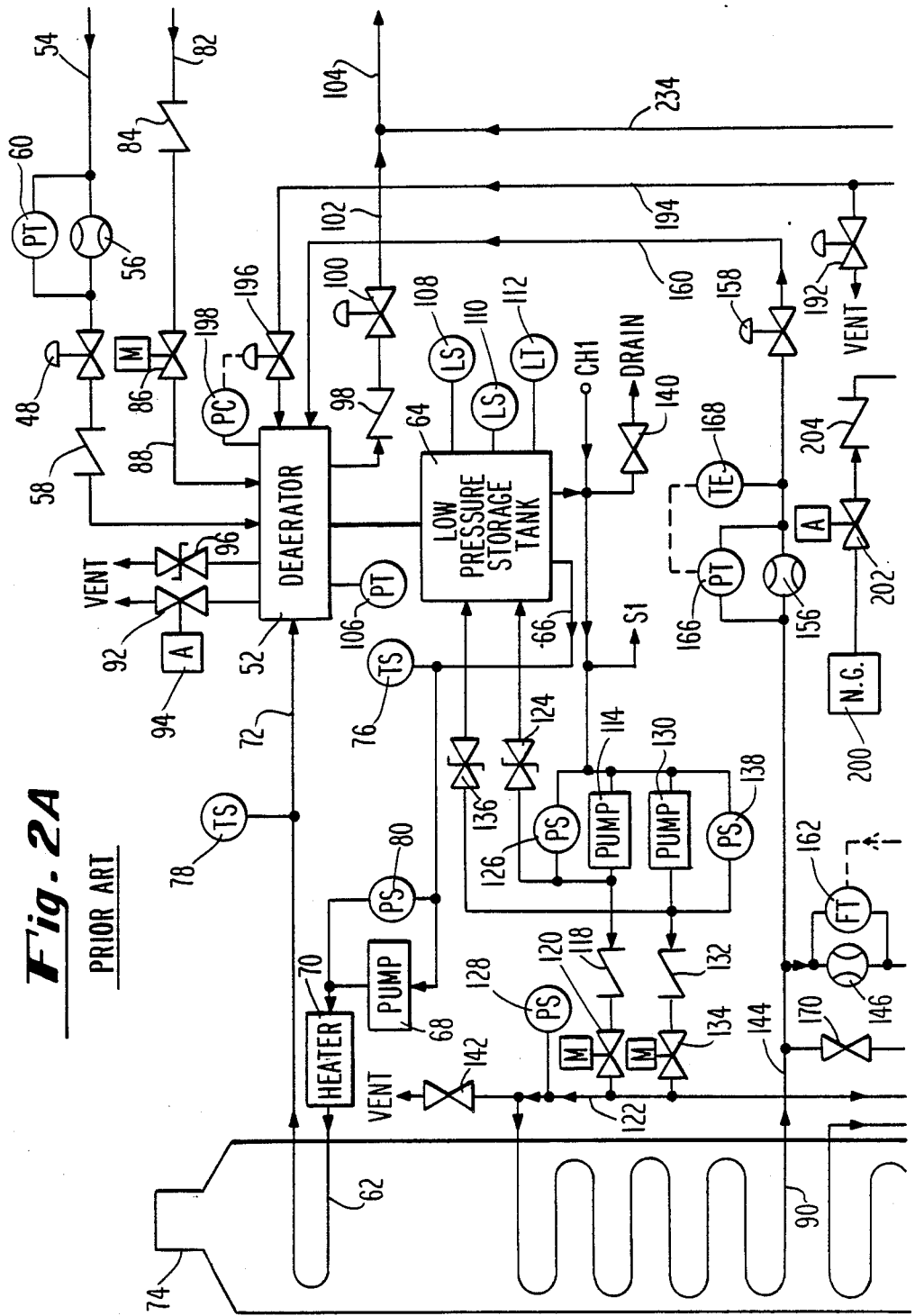
Figure 2B:
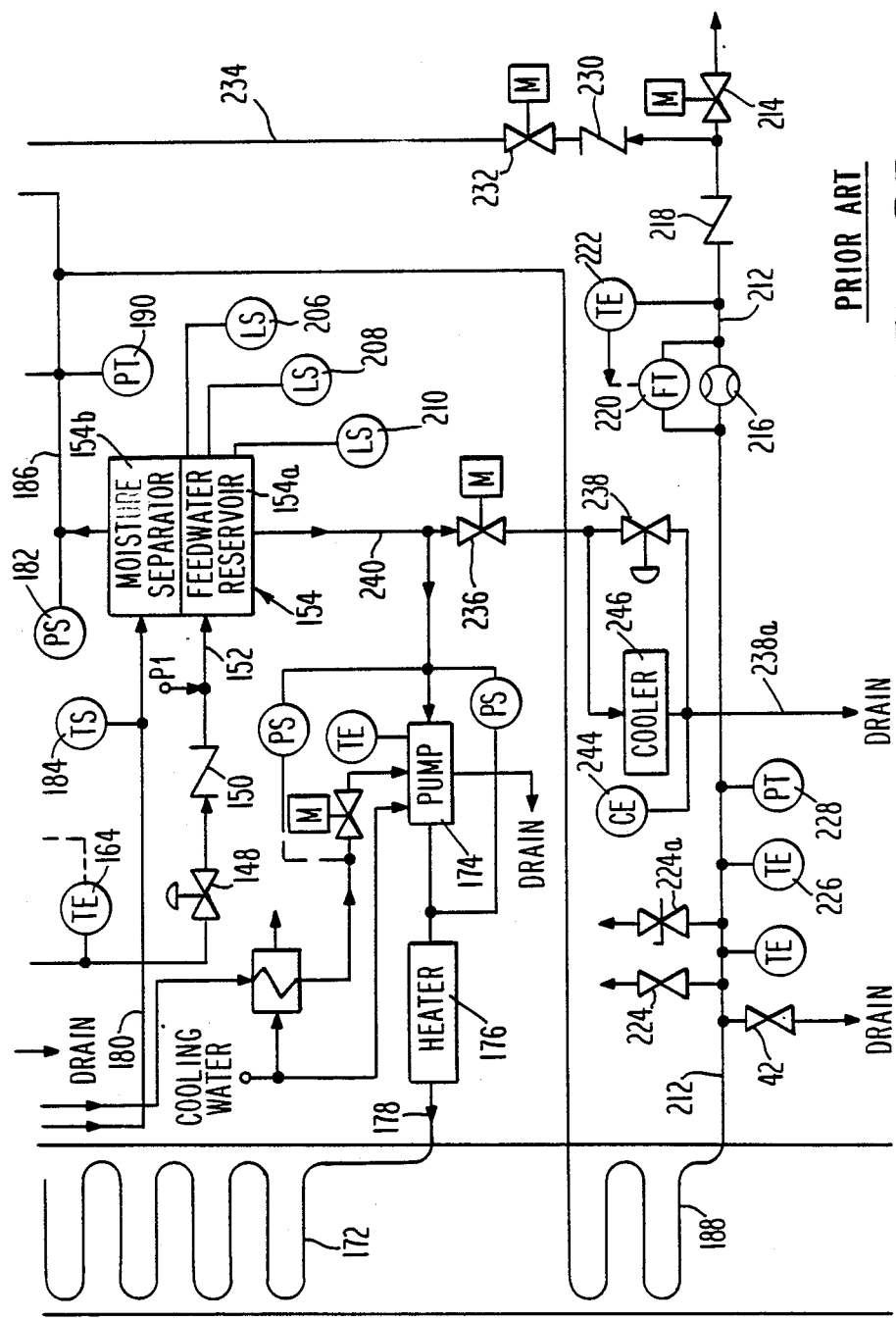

Referring now to FIGS. 2A-2C, various connections between a single gas turbine 12, a single steam turbine 28, and a single steam generator 24 of the plant 10 shown in FIG. 1 are represented with specific elements (e.g., pumps, valves, flow transmitters, etc.) in a similar manner to their representation in either of U.S. Pat. Nos. 3,953,966 or 3,965,675, each of which is assigned to the assignee of the present invention, and is incorporated herein by reference.

As shown in FIG. 2A, condensate from the condenser 44 (FIG. 1) is supplied to a deaerator 52 by way of a condensate pipe 54, a flow element 56, the condensate control valve 48, and a check valve 58. A flow transmitter 60 cooperates with the flow element 56 to provide an electrical signal which indicates the value of the condensate flow rate through the flow element 56. Flow element 56 provides a restriction in the flow path and flow transmitter 60 measures the pressure difference across the restriction. As is well known, this pressure difference is indicative of the flow rate. Thus, flow element 56 and flow transmitter 60 constitute a wellknown type of flowmeter for measuring fluid flow.

Deaerator 52 provides a feedwater heating action as well as a deaerating action, and it is of the spray-tray or jet tray type. As is conventional with typical spray-tray deaerators, the condensate which enters from check valve 58 is sprayed by way of spray nozzles 59 (FIG. 3) into a tray structure 61 (FIG. 3) which also receives steam from the low pressure evaporator tubes 62 as is explained in greater detail herein below. The water or condensate collected in the deaerator 52 then flows to a low pressure feedwater storage tank 64 which, among other things, serves as a storage reservoir for the deaerator 52. Water from this storage tank 64 flows by way of a pipe 66, a low pressure circulation pump 68, a standby electric heater 70, the low pressure evaporator tubes 62 and a pipe 72 to a steam inlet into the tray structure 61 inside the deaerator 52. Low pressure circulation pump 68 provides the desired fluid flow and the low pressure evaporator tubes 62 in the stack structure 74 serve to convert the water into steam. This steam is supplied to the deaerator 52 by way of pipe 72 to heat the condensate entering the deaerator 52 from check valve 58. This provides a substantial portion of the desired feedwater heating.

Heat for deaeration and feedwater heating is provided by a combination of either extraction steam that is supplied to the deaerator 52 by way of an extraction steam pipe 82, a check valve 84, a motoroperated isolation valve 86 and a steam pipe 88, or from the low pressure economizer tubes 62 and recirculation flow from the economizer 90. The amount of heat from the economizers is usually sufficient and the extraction steam can be shut off.

Deaerator 52 is provided with a low pressure vent valve 92 manipulated by an actuator 94, which is of the solenoid type that is controlled by appropriate control signals from control system 50 (FIG. 1). During normal operation, the vent valve 92 is kept fully open to allow air to escape from the deaerator 52. The deaerator 52 is also provided with a pressure safety valve 96. Deaerator 52 is provided with a further pressure release mechanism which includes a check valve 98 and a dump valve 100, the outlet side of the latter being connected by way of a pipe 102 to an auxiliary steam bypass pipe 104 by way of which steam may be returned to the desuperheater 40 and condenser 44. If the pressure within the deaerator 52 exceeds its design pressure rating (e.g., 100 pounds per square inch), dump valve 100 opens to dump the steam in the deaerator 52 back to the condenser 44. Among other things, this prevents a popping of the safety valve 96.

A pressure transmitter 106 senses the pressure within the deaerator 52 and provides a signal indicative of the value thereof. Level switches 108 and 110 monitor the water level within the storage tank 64, switch 108 producing an electrical warning signal if the water level is too high and switch 110 producing an electrical warning signal if the water level is too low. A level transmitter 112 produces an electrical signal indicative of the actual water level in the tank 64.

Boiler feedwater stored in th storage tank 64 is pumped through the economizer tubes 90 in the stack structure 74 by means of a main boiler feed pump 114. The intake side of boiler feed pump 114 is connected to the storage tank 64 by means of a feedwater pipe 116. The outlet side of boiler feed pump 114 is connected to the inlet side of economizer tubes 90 by means of a check valve 118, a motor operated block valve 120 and a feedwater pipe 122. Valve 120 is open during normal operation. The electric motor which runs the boiler feed pump 114 has a nominal rating of 1250 horsepower. A pressure safety valve 124 is connected between the outlet side of pump 114 and the storage tank 64. A pressure switch 126 monitors the pressure differences across the boiler feed pump 114 and produces an electrical warning signal if such pressure difference falls below a desired lower limit. A further pressure switch 128 monitors the pressure in the feedwater pipe 122 and produces an electrical warning signal if such pressure falls below a desired lower level.

A standby boiler feed pump 130 is connected in parallel with the main boiler feed pump 114 and the valves 118 and 120, the outlet side of this standby pump 130 being connected by way of a check valve 132 and a motor-operated block valve 134 to the feedwater pipe 122 which runs to the inlet of the economizer tubes 90. During normal operation of the steam generator 24, the standby pump 130 is turned off and the block valve 134 is closed. The electric motor which runs the standby pump 130 has a nominal rating of 25 horsepower. The standby pump 130 is used when the steam generator 24 is in either the hot standby mode or the freeze protection mode. At such time, the main boiler feed pump 114 is turned off and its block valve 120 is closed. A pressure safety valve 136 is connected to the outlet side of the standby pump 130 and is connected back to the storage tank 64. A pressure switch 138 monitors the pressure difference across the standby boiler feed pump 130 and produces an electrical warning signal when the pressure difference is too low.

A manually-operated drain valve 140 is provided for draining the deaerator 52 and storage tank 64 when the steam generator 24 is to be shut down for maintenance purposes or other desired reasons. A manually-operated vent valve 142 is connected to the economizer feedwater pipe 122 for venting air from the system when the steam generator 24 is being shut down and the system filled with a nitrogen blanket. During normal operation, the drain valve 140 and the vent 142 are closed.

During normal load operation, the main boiler feed pump 114 pumps boiler feedwater through the economizer tubes 90, such feedwater being obtained from the storage tank 64. Under typical peak load conditions, the feedwater leaving the storage tank 64 will be at a temperature of approximately 250° F. As this feedwater flows through the economizer tubes 90, it is heated to within 5° F. of the saturation temperature, that is, the temperature at which it will boil at the pressure at hand. Under typical peak load conditions, the feed-water leaving the economizer tubes 90 will be at a temperature of approximately 570° F.

Referring now also to FIG. 2B, the hot feedwater leaving the economizer tubes 90 goes to two different places. First, some of this feedwater flows by way of a pipe 144, a flow element 146, a feedwater control valve 148, a check valve 150 and a pipe 152 to the feedwater reservoir section 154a of a vertical steam drum 154. The remainder of the hot feedwater leaving economizer tubes 90 flow by way of pipe 144, a flow element 156, a recirculation control valve 158 and a pipe 160 back to the deaerator 52, wherein it serves to provide some of the heating of the condensate entering the deaerator 52.

During normal load operation, the feedwater control valve 148 and the recirculation control valve 158 are automatically controlled in a coordinated manner to keep constant the water flow rate through the economizer tubes 90. For example, if less water is required by the feedwater reservoir 154a (lower load level), then more water is recirculated back by way of the valve 158 to the deaerator 52, the proportions being such as to hold constant the water flow in the pipe 144. As the power generated by steam turbine 28 (FIG. 1) increases, more economizer water flow is desired to the feedwater reservoir 154a.

A flow transmitter 162 and a temperature element 164 are associated with the feedwater flow element 146, with the flow transmitter 162 providing an electrical signal indicative of the feedwater flow rate through the flow element 146 and the temperature element 164 providing temperature compensation for the flow rate signal. Similarly, a flow transmitter 166 and a temperature element 168 are associated with the recirculation path flow element 156, with the flow transmitter 166 providing an electrical signal indicative of the value of the flow rate of the water flowing back to the deaerator 52 and the temperature element 168 providing temperature compensation for the flow rate signal. A manually-operated drain valve 170 is connected to the feedwater pipe 144 for purposes of draining the economizer tubes 90 when the steam generator 24 is to be shut down. During normal operation, the drain valve 170 is closed.

The hot, nearly boiling feedwater in the feedwater reservoir 154a is pumped through the evaporator tubes 172 by way of a high pressure circulation pump 174, a standby electrical heater 176 and a pipe 178. As the hot feedwater flows through the high pressure evaporator tubes 172, it is converted into steam which is then supplied by way of a pipe 180 to the moisture separator section 154b of the steam drum 154. Under typical peak load conditions, the steam leaving the high pressure evaporator tubes 172 will be at a temperature of approximately 575° F.

The electrical heater 176 is used for standby and freeze protection purposes when the gas turbine 12 is not in service When the gas turbine 12 is not in operation and the steam generator 24 is in the hot standby mode, the heater 176 is controlled by a pressure switch 182 to maintain the proper steam pressure in the steam drum 154. In other words, pressure switch 182 turns on the heater 176 if the steam drum pressure falls below the desired minimum value. On the other hand, if the plant 10 is shut down for an extended period of time and the plant operator chooses not to generate steam in the steam generator 24, then the heater 176 is controlled by a temperature switch 184 to maintain the water in the steam drum 154 above the freezing point. The high pressure circulation pump 174 must be kept on and operating during either of these operating modes for the heater 176.

The moisture separator section 154b of the steam drum 154 receives the wet steam from the high pressure evaporator tubes 172 and removes practically all of the remaining water from such steam. The resulting dry steam leaves the moisture separator 154b and is supplied by way of a steam pipe 186 to the superheater tubes 188 located in the stack structure 74. Under typical peak load conditions, the dry steam leaving the moisture separator 154b is at a temperature of approximately 575° F. and a pressure of approximately 1300 pounds per square inch (absolute).

A pressure transmitter 190 generates an electrical signal which indicates the steam pressure at the outlets of the moisture separator 154b. A high pressure vent valve 192 is connected to the steam line 186 for purposes of, among other things, venting some of the steam if it appears that the steam pressure inside the steam drum 154 is becoming too large. During normal operation, the vent valve 192 is closed. The steam drum 154 is also provided with one or more pressure safety valves which for simplicity of illustration, are not shown.

A steam line 194 is connected from the main steam pipe 186 to a deaerator pressure control valve 196 which is, in turn, connected to an additional steam inlet of the deaerator 52. The control valve 196 is controlled by a pressure controller 198 which is responsive to the pressure within the deaerator 52. Pressure controller 198 and control valve 196 function to maintain the desired steam pressure in the deaerator 52 at part loads for the plant 10. If the steam pressure within the deaerator 52 falls below the desired value, then pressure controller 198 opens the valve 196 to bring the pressure back up to the desired value. This is most likely to occur at part loads of less than about 80% because, in such cases, the extraction steam is being supplied to the deaerator 52.

A nitrogen gas supply 200 is connected to the main steam pipe 186 by way of an actuator-operated nitrogen admission valve 202 and a check valve 204. During normal operation, the nitrogen admission valve 202 is closed and no nitrogen is admitted into the steam system. Valve 202 is opened during the process of draining and venting the steam generator 24 and transferring it to a dry status. The nitrogen valve 202 is opened as more or less the final step in this process, and the nitrogen gas is admitted into the steam system for purposes of replacing steam which condenses in the system during the draining and venting process. Among other things, this minimizes subsequent rusting or scaling in the steam drum 154 and the evaporator and superheater tubes 172 and 188 and other parts of the steam generator 24.

The feedwater reservoir section 154a of the steam drum 154 is provided with a high-indicating level switch 206, a low-indicating level switch 208 and a level transmitter 210. Switch 206 produces an electrical warning signal when the water level in the reservoir 154a gets too high, while switch 208 produces an electrical warning signal when the water level gets too low. Level transmitter 210 produces an electrical signal indicating the actual water level in the reservoir 154a. The water level signal from the transmitter 210 is supplied to a controller (not shown) which controls the feedwater control valve 148 to maintain a fairly constant water level in the feedwater reservoir 154a.

As the dry steam from the steam drum 154 flows through the superheater tubes 188, it is further heated to raise its temperature another 300° to 400° F. Under the typical peak load conditions, the superheated steam flowing in a main steam outlet line 212 is at a temperature of 952° F. and a pressure of approximately 1277 pounds per square inch (absolute). During normal operation of the plant 10, this superheated steam flows by way of main steam outlet line 212, isolation valve 32, steam pipe 34 and steam turbine valves 35a, 35b, 308a and 308b to the main steam inlet of the steam turbine 28 (FIG. 1). Connected in series in the main steam outlet line 212 are a flow element 216 and a check valve 218. A flow transmitter 220 and a temperature element 222 (for temperature compensation of flow transmitter 220) are associated with the flow element 216, the flow transmitter 220 producing an electrical signal indicating the value of the output steam flow rate for the steam generator 24. During normal load operation, the main steam isolation valve 32 is, of course, fully open.

There is also connected to the main steam outlet line 212 a normally-closed manually-operated vent valve 224, a pressure safety valve 224a, a temperature element 226 and a pressure transmitter 228. During normal operation, the vent valve 224 and the previously considered drain valve 42 are closed. Temperature element 226 and a pressure transmitter 228 generate electrical signals which indicate the temperature and pressure of the steam in the outlet line 212 and transmit such signals to the control system 50.

In certain situations, the main steam isolation valve 32 is closed and the steam produced by the steam generator 24 is bypassed to the condenser 44 by way of an auxiliary steam bypass path which includes a check valve 230, a motor-operated block valve 232 and a steam line 234 which runs to and connects with the auxiliary steam bypass line 104 which communicates with the desuperheater 40. This particular arrangement wherein the main steam isolation valve 32 is closed and the auxiliary bypass block valve 232 is open is employed, for example, to drain the outlet steam line 212 of water when one steam generator 24 is to be started up after the other steam generator 24 has already been put into operation and is busy supplying steam to the steam turbine 28.

The steam generator 24 further includes an automatic "blowdown" mechanism for minimizing the buildup of mineral deposits on the inner walls of the high pressure evaporator tubes 172. This blowdown mechanism includes a motor-controlled blowdown block valve 236 and a blowdown control valve 238 which are connected in series between the feedwater outlet pipe 240 of the steam drum 154 and an appropriate drain or sewer outlet 238a. During normal operation, the block valve 236 is full open.

The blowdown control valve 238 is controlled by a signal developed by a conductivity element 244 which continuously measures the conductivity of a sample portion of the steam drum feedwater, which sample portion flows by way of the block valve 238 and a cooler 246 to the drain outlet 238a. Conductivity element 244 is connected to the outlet side of the cooler 246, the function of the cooler 246 being to cool the feedwater sample to a temperature suitable for the conductivity element 244. The conductivity element 244 cooperates with a conductivity transmitter (not shown) to generate an electrical signal indicative of conductivity, which signal is transmitted to a conductivity controller (not shown) which controls the blowdown control valve 238.

The conductivity element 244 provides an electrical signal which indicates the electrical conductivity of the feedwater flowing in the steam drum outlet pipe 240. The "hardness" or mineral content of the feedwater in the steam drum outlet pipe 240 determines the conductivity of this feedwater The greater the hardness or mineral content, the greater the conductivity.

The conductivity element 244 and its associated conductivity controller operate to adjust the degree of opening of the blowdown control valve 238 so as to keep the feedwater mineral content below a desired limit. If the feedwater mineral content increases above the desired limit, then the blowdown control valve 238 is opened to a greater degree to dump a greater amount of the steam drum feedwater into the drain outlet 238a. This tends to lower the water level in the system. This, in turn, signals a makeup water pump (not shown) and the makeup water valve (also not shown) to add fresh demineralized water to the system. This brings the mineral content of the water in the system back down to the desired level.

As seen from the foregoing description, the heat recovery steam generator 24 includes not only the stack structure 74 and the various boiler tubes 62, 90, 172 and 188 located therein, but also the deaerator 52, the storage tank 64, the steam drum 154 and the various other items 54–246 considered in connection therewith.

Referring now more specifically to FIG. 2C, it can be seen that the plant 10 (FIG. 1) further includes a pair of chemical treatment systems 248 and 250 for injecting various chemicals into each of the subsystems associated with the first and second heat recovery steam generators 24 for minimizing corrosion and the buildup of mineral deposits in the boiler tubes 62, 90, 172 and 188, steam drums 154, storage tanks 64 and the like. The first chemical treatment system 248 is primarily associated with one steam generator 24 and the second chemical treatment system 250 is primarily associated with the other steam generator 24 though, as can be seen, there is some degree of overlap. The particular chemicals which are typically injected by the chemical treatment systems 248 and 250 are amine (or ammonia), hydrazine and phosphates, wherein the letter "A" denotes amine, the letter "H" denotes hydrazine, and the letter "P" denotes phosphates.

The first chemical treatment system 248 takes a first fluid sample from a first sample outlet S1 (FIG. 2A) which is located on the feedwater pipe 116 coming from the storage tank 64, analyzes it and then automatically injects the proper amount of amine (A1) and hydrazine (H1) into the system via the chemical injection inlet CH1 (FIG. 2A) which is also located on the feedwater pipe 116, but upstream of the sample outlet S1. The first chemical treatment system 248 also takes a second fluid sample from the system by way of sample outlet S2 (FIG. 1) which is connected to the condensate pipe 54 running to the deaerator 52 (FIG. 2A), analyzes it and then automatically injects the appropriate amounts of amine (A2) and hydrazine (H2) into the system via chemical injection inlet CH2 (FIG. 1) which is connected to the condensate pipe 54 immediately upstream of the sample outlet S2. Phosphate (P1) is injected into the system by way of a phosphate injection inlet P1 (FIG. 2B) which is located on the feedwater pipe 152 at the inlet to the feedwater reservoir 154a of the steam drum 154. The phosphate injection control is manually in nature. The injection rate is adjusted at periodic intervals by the plant operator after studying the results of the chemical analyses which are automatically performed and recorded by equipment included in the chemical treatment systems 248 and 250.

Having now described the details of known combined cycle power plants, and referring now to FIG. 3, there is shown a deaerating subsystem 260 in accordance with the present invention. This improved subsystem 260, like most known deaerating subsystems, includes a spraytray type deaerator 52 and a storage tank 64. However, unlike known deaerating subsystems, the deaerating subsystem 260 routes all of the thermal energy inputs directly to the storage tank 64 instead of the deaerator 52.

That is, the heated feedwater from the economizer recirculation line 160 (FIG. 2A), and the low pressure steam line 194 (i.e., the "pegging" line) are connected directly to the storage tank 64 instead of to the deaerator 52. Also coupled to the storage tank 64 is a flash vapor line 262.

Condensate bypass means 264 is also provided to enable the condensate coming from the condenser 44 (FIG. 1) through the flow control valve 48 and check valve 58 to be routed either to the deaerator 52 or to the storage tank 64. One stop valve 266 in a first branch 268 of the condensate bypass means 264 permits a stoppage of flow of the condensate to the deaerator 52, while another stop valve 270 in a second branch 272 of the condensate bypass means 264 permits a stoppage of flow of the condensate to the storage tank 64. The second branch 272 of the condensate bypass means 264 also includes atomizing means 59 within the storage tank 64. Such atomizing means 59 may comprise any known means for atomizing the flow of the condensate through the second branch 272 of the condensate bypass means 264 (e.g., the same spray nozzle that is used in the deaerator 52).

In order to permit the degasified condensate to flow from the lowermost tray 61 in the deaerator 52 to the storage tank 64, downcomer means 274 is provided therebetween. The downcomer means 274 simply comprises large piping with flange means 276 including provision for installing a blind flange 278 therein. Similarly, and in order to permit vapor from the storage tank 64 to be used in degasifying the condensate entering the deaerator 52 during normal operations, vapor riser means 280 are provided between the storage tank 64 and the deaerator 52. Such vapor riser means 280, like the downcomer means 274, simply comprises large piping with flange means 276 including provision for installing a blind flange 278 therein.

As is conventional, the storage tank 64 includes level sensing and transmitter means (108, 110 and 112 in FIG. 2A) to maintain a predetermined level of heated condensate therein as controlled by the control system 50 (FIG. 1) in a well known manner. The storage tank 64 in accordance with the present invention also includes vent means 282 that is controlled by a vent valve 284. Moreover, the thermal energy input means that are routed to the storage tank 64 in accordance with the present invention each include a stop valve 286 to isolate the respective inputs of thermal energy.

A method of operating the combined cycle power plant 10 in accordance with the present invention, in spite of its deaerator 52 being removed from service will now be explained in conjunction with all of the figures. A failed deaerator 52 is detected in a known manner through the determination of an increased oxygen content in the feedwater.

Immediately thereafter, the injection rate of chemical oxygen scavengers is provided by one or both of the chemical treatment systems 248, 250. In accordance with one important aspect of the present invention, this step is necessary in order to reduce the oxygen content of the feedwater to the maximum extent possible, although other known alternate methods of degasifying without operation of the deaerator 52 may be used.

The operating temperature and pressure of the failed deaerator 52 are then reduced by modulating the control valves 158 and 196 closed, respectively, for the economizer circulation and pegging lines. This step may be accomplished either by adjusting the set point of the deaerator pressure controller 198 (FIG. 2A), or direct remote/manual closing of valves 158 and 196. Condensate from the condenser 44 (FIG. 1) is continued to be input through the failed deaerator 52 via the first branch 268 of the condensate bypass means 264 to assist in cooling down the deaerator 52.

In either case, after the operating temperature and pressure of the failed deaerator 52 have reached a predetermined safe point, the block valves 286 on each of the thermal energy inputs to the storage tank 64 are closed. The flash vapor input 262 from the blowdown flash tank is safely isolated by temporarily shutting off the blowdown from the steam drum 154 (FIG. 2B), and by using intermittent blowdowns, as necessary, to control drumwater chemistry during the deaeration isolation procedures in accordance with the present invention.

All vents 92, 96 on the deaerator 52 are then checked to be opened in order to ensure that the subsystem is at atmospheric pressure. The condensate from the condenser 44 (FIG. 1) is allowed to continue through the first branch 268 of the condensate bypass means 264, but the stop valve 270 on the second branch 272 of the condensate bypass means 264 is also then opened to allow the condensate to be routed also to the storage tank 64 through the spray nozzle 59 therein. Then, the stop valve 266 in the first branch 268 of the condensate bypass means 264 is closed, while the storage tank 64 is maintained on level control with the condensate redirected through the second branch 272 of the condensate bypass means 264.

Each of the bolts (not shown) which secure the flange means 276 into the downcomer means 274 and the vapor riser means 280 are loosened to permit the blind flanges 278 therein to be inserted across such vapor riser means 278 and downcomer means 274. These blind flanges 278, thus, isolate the failed deaerator 52 from the storage tank 64.

All of the block valves 286 of the thermal energy input means to the storage tank 64 are then opened, and normal flows therethrough with automatic control thereof by the control system 50 (FIG. 1) are reestablished to maintain safe operating temperature and pressure within the storage tank 64. The failed deaerator 52 may then be opened for inspection and repairs as necessary.

When the repairs to the failed deaerator 52 have been completed, the reverse of the above steps is used. The storage tank 64 is first depressurized, cooled and isolated from the deaerator 52 by modulating the thermal energy input means thereto closed, allowing the condensate to flow therethrough, reestablishing flow of the condensate through the first branch 268 of the condensate bypass means 264, and opening the vent valve 284 to the vent 282 of the storage tank 64.

The blind flanges 278 are then removed from each of the downcomer means 274 and vapor riser means 280, the stop valve 270 of the second branch 272 is next closed, and normal automatic operations of the combined cycle power plant 10 with the deaerator 52 back in service are resumed by ramping the economizer circulation valve 158 and pegging valve 196 open.

Obviously, many modifications and variations of the present invention are possible in light of the above teachings. For example, the method and apparatus disclosed above not only provide for a continuation of the performance of the secondary functions of the deaerator, in spite of its being removed from service, but they also permit some amount of degasification to take place. Accordingly, the chemical or other known alternate methods and apparatus for scavenging oxygen from the feedwater are not critical to the performance of this invention. It is to be understood, therefore, that within the scope of the appended claims, the present invention may be practiced otherwise than as is specifically described herein.

What we claim as our invention is:

1. A combined cycle power plant, comprising:
    a deaerator having primary and secondary functions, said primary function to degasify feedwater for use in the combined cycle power plant;
    means for normally coupling said deaerator to the combined cycle power plant as a normally functioning part thereof;
    means for isolating said deaerator from the combined cycle power plant during operations thereof; and
    alternate means for performing said primary and secondary functions when said deaerator is isolated from the combined cycle power plant, during operations thereof, by said isolating means.

2. The combined cycle power plant according to claim 1, further comprising a low pressure storage tank coupled to receive said degasified feedwater from said deaerator.

3. The combined cycle power plant according to claim 2, wherein said secondary functions comprise:
    a first function of heating said feedwater to a temperature sufficient to avoid corrosion of selected points within the combined cycle power plant;
    a second function of providing a source of said feedwater that is of sufficient capacity and head pressure for steady state and transient operations of the combined cycle power plant; and
    a third function of providing a location for input of low level thermal energy to the combined cycle power plant in order to enhance its overall efficiency. power plant in order to enhance its overall efficiency.

4. The combined cycle power plant according to claim 3, wherein said alternate means is connected to said low pressure storage tank.

5. In a deaerating subsystem of a combined cycle power plant which includes a deaerator that is coupled to receive condensate from a source for degasification of the condensate by the deaerator, and a storage tank, the improvement comprising:

condensate bypass means for preventing reception of the condensate by the deaerator, and for enabling the storage tank to receive the condensate;

means for inputting thermal energy into the storage tank, wherein said thermal energy input means is adapted to input controlled amounts of heated condensate and controlled amounts of dry steam;

a spray nozzle coupled to said condensate bypass means within the storage tank, said spray nozzle adapted to atomize the condensate;

downcomer means for coupling the deaerator to the storage tank to receive the degasified condensate therefrom, said downcomer means including flange means with a blind flange adapted to be inserted within said downcomer means to selectively prevent reception of the degasified condensate by the storage tank; and vapor riser means coupling the storage tank to the deaerator to receive dry steam from the storage tank, said vapor riser means including flange means with a blind flange adapted to be inserted within said vapor riser means to selectively prevent reception of the dry steam by the deaerator;

whereby the deaerator, through insertion of said blind flanges in said downcomer means and said vapor riser means, is adapted to be isolated from the combined cycle power plant during operations thereof.

6. The improvement according to claim 5, wherein said thermal energy input means further comprises means for inputting flash vapor.

7. The improvement according to claim 5, further comprising means for venting the storage tank.

8. A deaerating subsystem for use in a combined cycle power plant of the type having a gas turbine, a steam turbine, and a steam generator producing motive steam from feedwater that is pumped therethrough by a boiler feed pump, wherein the combined cycle power plant is adapted to be operated at an overall efficiency, said deaerating subsystem comprising;

a deaerator adapted for receiving a supply of condensate, and for performing a primary function of degasifying said condensate as well as a plurality of secondary functions including heating the feedwater a sufficient amount to prevent corrosion of selected portions of the steam generator, providing a source of the feedwater of a sufficient capacity and head pressure to satisfy requirements of the boiler feed pump during steady state and transient operations of the plant, and providing a location for inputting selected amounts of thermal energy to enhance the overall efficiency;

a storage tank coupled to the deaerator by downcomer means, said downcomer means including flange means with a blind flange which is adapted to be inserted within the downcomer means for selectively preventing reception of said degasified condensate by the storage tank;

condensate bypass means for preventing the reception of the condensate by the deaerator, and for enabling the storage tank to receive the condensate;

means for inputting thermal energy into the storage tank, wherein said thermal energy input means is adapted to input controlled amounts of heated condensate from the steam generator, and controlled amounts of dry steam; and vapor riser means coupling the storage tank to the deaerator for reception thereby of the dry steam from the storage tank, said vapor riser means including flange means with a blind flange which is adapted to be inserted within the vapor riser means for selectively preventing such reception of the dry steam by the deaerator;

whereby the deaerator is adapted to be isolated from an operating combined cycle power plant.

9. The deaerating subsystem according to claim 8, wherein said condensate bypass means comprises:

first valve means for controlling a level of the condensate in said storage tank, said first valve means coupled to said supply of condensate;

pipe means coupled to said first valve means downstream thereof, said pipe means including a first branch connected to said deaerator and a second branch connected to said storage tank;

second valve means for controlling said supply of condensate through said first branch;

third valve means for controlling said supply of condensate through said second branch; and means, coupled to an end of said second branch within said storage tank, for substantially atomizing said supply of condensate to said storage tank.

10. The deaerating subsystem according to claim 9, wherein said first valve means comprises:

a flow control valve capable of being throttled between a fully open position and a fully closed position, said flow control valve adapted to be operated by remote means;

a check valve downstream of said flow control valve, said check valve adapted to prevent said supply of condensate from flowing in a direction through said first valve means other than towards said deaerator.

11. The deaerating subsystem according to claim 9, wherein said second valve means comprises a stop valve.

12. The deaerating subsystem according to claim 9, wherein said third valve means comprises a stop valve.

13. The deaerating subsystem according to claim 9, wherein said atomizing means comprises a spray nozzle.

14. The deaerating subsystem according to claim 8, wherein said thermal energy input means comprises:

means, coupled in a loop with said storage tank, for heating said condensate and for returning same to said storage tank;

means, coupled in a loop with said storage tank, for producing steam from the feedwater and for returning said steam so produced to said storage tank; and means for inputting flash vapor to said storage tank.

15. The deaerating subsystem according to claim 14, wherein said condensate heating means comprises:

first means, within the steam generator, for receiving said condensate from said storage tank and for heating same to a first degree;

second means, within the steam generator, for receiving said heated condensate from said storage tank and for heating same to a second degree;

pipe means from said second heating means to said storage tank;

a flow control valve capable of being throttled between a fully open position and a fully closed position, said flow control valve adapted to be operated by remote means;

a stop valve downstream of said flow control valve, said stop valve adapted to prevent said supply of condensate heated to said second degree from flowing into said storage tank.

16. The deaerating subsystem according to claim 14, wherein said steam producing means comprises:
   third heating means, within the steam generator, for receiving said condensate heated to a second degree and converting same to saturated steam;
   means, coupled to said third heating means, for converting same to substantially dry steam;
   a flow control valve capable of being throttled between a fully open position and a fully closed position, said flow control valve adapted to be operated by remote means;
   a stop valve downstream of said flow control valve, said stop valve adapted to prevent said supply of condensate heated to said second degree from flowing into said storage tank.

17. A method of constructing a combined cycle power plant, comprising the steps of:
   providing a deaerator having a primary and secondary functions, said primary function to degasify feedwater for use in the combined cycle power plant;
   providing means for normally coupling said deaerator to the combined cycle power plant as a normally functioning part thereof;
   providing means for isolating said deaerator from the combined cycle power plant during operations thereof; and
   providing alternate means for performing said primary and secondary functions when said deaerator is isolated from the combined cycle power plant, during operations thereof, by said isolating means.

18. The method according to claim 17, further comprising the step of providing a low pressure storage tank coupled to receive said degasified feedwater from said deaerator.

19. The method according to claim 18, wherein said secondary functions comprise the steps of:
   performing a first function of heating said feedwater to a temperature sufficient to avoid corrosion of selected points within the combined cycle power plant;
   performing a second function of providing a source of said feedwater that is of sufficient capacity and head pressure for steady state and transient operations of the combined cycle power plant; and
   performing a third function of providing a location for input of low level thermal energy to the combined cycle power plant in order to enhance its overall efficiency.

20. The method according to claim 19, wherein said step of providing alternate means includes the step of connecting said alternate means to said low pressure storage tank.

21. A method of operating a combined cycle power plant that includes a condenser, a heat recovery steam generator including a deaerator adapted to receive and degasify condensate from the condenser and a storage tank coupled to receive the degasified condensate from the deaerator and adapted to store feedwater in the form of the degasified condensate, said method comprising the steps of:
   providing condensate bypass means for preventing the reception of the condensate by the deaerator, and for enabling the storage tank to receive the condensate;
   providing means for inputting thermal energy into the storage tank, wherein said thermal energy input means is adapted to input controlled amounts of heated condensate from the heat recovery steam generator, and controlled amounts of dry steam;
   providing a spray nozzle coupled to said condensate bypass means within the storage tank, said spray nozzle adapted to atomize the condensate;
   providing vent means for the storage tank;
   providing downcomer means coupling the deaerator to the storage tank for reception thereby of the degasified condensate from the deaerator, said downcomer means including flange means with a blind flange which is adapted to be inserted within the downcomer means for selectively preventing such reception of the degasified condensate by the storage tank;
   providing vapor riser means coupling the storage tank to the deaerator for reception thereby of the dry steam from the storage tank, said vapor riser means including flange means with a blind flange which is adapted to be inserted within the vapor riser means for selectively preventing such reception of the dry steam by the deaerator;
   detecting a failure of the deaerator;
   reducing the operating temperature and pressure of said failed deaerator;
   isolating said thermal energy inputs to the storage tank;
   venting said failed deaerator;
   redirecting flow of the condensate through said condensate bypass means, thereby preventing flow of the condensate to said failed deaerator and permitting same to flow to the storage tank;
   inserting said blind flanges in said downcomer means and said vapor riser means to isolate said failed deaerator from the storage tank; and
   reopening said thermal energy input means to the storage tank;
   whereby the deaerator is adapted to be isolated from the combined cycle power plant during operations thereof.

22. The method according to claim 21, wherein said step providing said thermal energy input means further comprises the step of providing means for inputting flash vapor.

23. The method according to claim 21, further comprising the steps of:
   providing chemical treatment means for the feedwater in the combined cycle plant; and
   scavenging gases from the feedwater in the combined cycle plant by injecting selected chemicals through said chemical treatment means.

* * * * *